(12) United States Patent
Wang

(10) Patent No.: US 10,601,045 B1
(45) Date of Patent: Mar. 24, 2020

(54) POROUS CARBON ELECTRODE ASSEMBLY FOR ELECTROCHEMICAL DEVICES

(76) Inventor: Jing Wang, Amherst, MA (US)

(*) Notice: Subject to any disclaimer, the term of this patent is extended or adjusted under 35 U.S.C. 154(b) by 450 days.

(21) Appl. No.: 13/437,403

(22) Filed: Apr. 2, 2012

Related U.S. Application Data

(60) Provisional application No. 61/475,306, filed on Apr. 14, 2011.

(51) Int. Cl.
*H01M 4/60* (2006.01)

(52) U.S. Cl.
CPC .................................. *H01M 4/60* (2013.01)

(58) Field of Classification Search
None
See application file for complete search history.

(56) References Cited

U.S. PATENT DOCUMENTS

| | | | | |
|---|---|---|---|---|
| 4,293,396 A | * | 10/1981 | Allen et al. | 205/533 |
| 2008/0254362 A1 | * | 10/2008 | Raffaelle | B82Y 30/00 |
| | | | | 429/188 |
| 2011/0003211 A1 | * | 1/2011 | Hudson et al. | 429/304 |

OTHER PUBLICATIONS

Jing Wang, "Nanoporous Carbon Composite as Electrode for Electrochemical Capacitors", Proceedings of The 45th Power Sources Conference, Jun. 11-14, 2012, 615, USA.

\* cited by examiner

*Primary Examiner* — Karie O'Neill Apicella

(57) ABSTRACT

A porous carbon electrode assembly and the process for making it. The electrode assembly comprises at least one porous carbon composite electrode and at least one interfacial polymer binder layer impregnating into pores of the carbon composite electrode. The interfacial polymer binder layer, which binds the porous carbon composite electrode to a second electrode or to a current collector, is electronically conducting or is both electronically conducting and ionically insulating. In application as a bipolar porous carbon electrode assembly, the interfacial polymer binder layer serves as a cell separator.

12 Claims, 2 Drawing Sheets

POROUS CARBON ELECTRODE ASSEMBLY FOR ELECTROCHEMICAL DEVICES

This US patent application claims priority to U.S. Provisional Patent Application Ser. No. 61/475,306 entitled "Porous Carbon Electrode Assembly for Electrochemical Devices" filed on Apr. 14, 2011, having Jing Wang, listed as the inventor, the entire content of which is hereby incorporated by reference.

Inventor of the present invention is also the inventor of an invention relating to the process of making monolithic activated carbon/carbon composites, porous carbon composites, also called porous carbon foam composites, as well as monolithic porous carbon disks. The references are U.S. Pat. No. 7,704,422 B2, U.S. Pat. No. 7,919,024 B2, and U.S. Pat. No. 8,414,805.

FIELD OF THE INVENTION

The present invention relates to electrode assemblies for electrochemical devices using porous carbon composites, including activated carbon/carbon composites as active electrode materials, and an interfacial polymer binder layer between the electrodes or between the electrode and a current collector. The electrochemical devices herein are electrochemical capacitors, batteries, hybrid capacitor/batteries or asymmetric capacitors, fuel cells, photovoltaic solar cells, and capacitive desalination devices. The porous carbon composites are self standing with sufficient mechanical strength, binder free, and 0.10 ohm cm or less specific bulk electric resistance. The present invention provides a process of making such electrode assemblies. The porous carbon composites are prepared according to the procedure described in U.S. Pat. Nos. 7,704,422, 7,919,024, and 8,414,805. The porous carbon composites include activated carbon/carbon, graphite/carbon, silicon/carbon, silicon/graphite/carbon, metal/carbon, and metal oxide/carbon compositions.

BACKGROUND

Porous carbon electrodes with high surface area in the carbon phase are important components in electrochemical devices. Conventional activated carbon electrodes are prepared from activated carbon powder bound by polymer binder. Metallic current collectors are required to shorten the electric pathway between the carbon electrode and current collecting assembly. For use in corrosive liquid electrolyte, the current collector is protected by an electrically conductive coating. Such coating introduces high contact resistance between the coating and the carbon electrode, significant bulk electrical resistance of the coating, and technical challenges for making an uniform thin coating with high electrical conductivity.

Binderless porous carbon composites in electrochemical devices may function as both electrode and current collector. One problem with use of porous carbon composite electrodes is difficulty of attaching a metallic terminal to the carbon electrode. Another problem is relatively low electrical conductivity of carbon compared to metallic or graphitic current collectors. Thus, an assisting current collector bound to porous carbon electrode is often needed. One problem with use of metallic current collectors, particularly in corrosive liquid electrolytes, is the corrosion of the metallic current collector.

In these respects, the disclosed electrode assembly in the present invention by using binderless porous carbon composites as active carbon electrodes departs substantially from the conventional concepts and designs of previous arts. In so doing, the present invention provides flexible and economical ways to assemble porous carbon electrodes with minimum electric resistance.

In the present disclosure, need of an additional conductive coating on the current collector is obviated. Instead the current collector is in direct physical contact with the porous carbon electrode bound by an interfacial polymer binder layer.

Electrochemical devices with multiple cells may require ionic separator as cell separator between the carbon electrodes. In the present disclosure, an interfacial polymer binder layer binding two binderless porous carbon electrodes in direct physical contact functions as an ionic separator.

SUMMARY

The present invention provides a bipolar porous carbon electrode assembly as well as the process of making it. In this form, the assembly comprises two electrodes in direct physical contact, at least one of which is a binderless porous carbon composite, particularly an activated carbon/carbon composite, and an interfacial polymer binder layer having polymer impregnating into the pores of the carbon composite electrode or electrodes. The polymer binder layer is electronically conducting while ionically insulating, which could serve as a cell separator.

The present invention also provides a porous carbon electrode assembly as well as the process of making it. The assembly comprises at least one porous carbon composite electrode bound to an electrically conducting solid object, comprising a current collector or a second electrode, by an interfacial polymer binder layer having polymer impregnating into the pores of the porous carbon electrode and embedding the areas of physical contact between the porous carbon electrode and the solid object. The interfacial polymer binder layer is either electronically conducting or both electronically conducting and ionically insulating. The interfacial polymer binder layer may serve as a cell separator for bipolar porous carbon electrode assembly when the solid object is the second electrode and/or may serve as a protective coating to the current collector to prevent the electrolyte within the porous carbon electrode from contacting the current collector when the solid object is the current collector in the electrode assembly. As an option, the current collector is sandwiched between one carbon composite electrode and one electrode that is not carbon composite, for example, a battery electrode.

One purpose for making a bipolar porous carbon composite electrode assembly is to make electrochemical capacitors with multiple cells. Another purpose for making a porous carbon composite electrode assembly is for use as an electrode in battery/capacitor hybrids, more particularly as the anode for lead acid battery/capacitor hybrid or nickel/carbon battery/capacitor hybrid.

The process of making an electrode assembly of the present invention is conducted preferably by placing a polymer film between the porous carbon composite electrode and the other electrode or between the porous carbon composite electrode and the current collector, followed by thermal pressing at or above melting temperature or above the softening temperature of the polymer binder. During the pressing process, the polymer melt impregnates into pores of the carbon composite to form an interfacial polymer binder layer within the carbon electrode, which binds the porous carbon electrode with the other electrode or with the current collector.

The porous carbon composites, particularly activated carbon/carbon composites, described in U.S. Pat. No. 7,704,422B2, are self standing, binder free, and with sufficient compression strength to endure 300 psi or greater compression pressure.

DETAILED DESCRIPTION OF PREFERRED EMBODIMENT

Numbers on the drawings designate the corresponding objects: 1—porous carbon composite electrode plate or film; 2—the second electrode, which could be another porous carbon composite electrode; 3—interfacial polymer binder layer; 4 and 5—sections of the polymer film not subjected to the thermal treatment and compression; 6—current collector; 7—bipolar electrode; 8—porous carbon composite electrode; 9—electrode separator; 10—conductive carbon film functioning as current collector and packaging; 11—non-conductive binder; 12—metallic current collecting plates; 13—lead terminal, 14—interfacial polymer binder layer.

In the following patent description, the porous carbon composite electrodes refer to monolithic porous carbon composite, more specifically to activated carbon/carbon composite, which incorporates activated carbon powder and carbon fiber therein. The porous carbon composites are prepared according to the procedure described in U.S. Pat. Nos. 7,704,422 B2, 7,919,024, and 8,414,805.

The present invention relates to the electrode assembly comprising one or more than one electrode and the process of making. At least one of the electrodes is a porous carbon composite electrode bound by an interfacial polymer binder layer to another electrode or to a current collector. The interfacial polymer binder layer, having polymer impregnating into the pores of the porous carbon composite electrode or electrodes, is electronically conducting, or is both electronically conducting and ionically insulating. The porous carbon composite electrode is in direct physical contact with the other electrode or with the current collector.

The porous carbon composite electrodes are normally prepared in the shape of plates or flexible films. However, other geometric shapes, for example cylindrical shapes, can be used. In the electrode assembly, one of the surface planes of the porous carbon composite electrode is bound by the interfacial polymer binder layer to the other electrode or current collector.

One application of the electrode assembly comprising two electrodes is for use as a bipolar electrode in which the two electrodes possess opposite polarities, such as cathode and anode in electrochemical devices. The interfacial polymer binder layer serves as cell separator.

Another application of the electrode assembly is for use as an electrode composite in which the two electrodes possess same polarities in electrochemical devices.

Yet another application of the electrode assembly is to bind a current collector or a metallic current terminal to the porous carbon composite electrode through an interfacial polymer binder layer with minimum electrical resistance.

Figure 1:
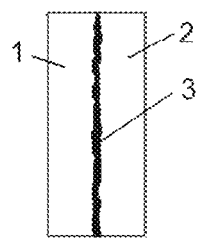
FIG. 1 is side view of a bipolar carbon electrode configuration.
Figure 1:
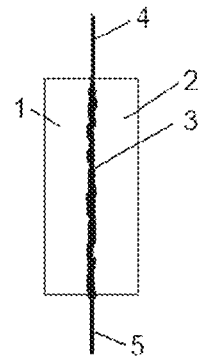

Referring to FIG. 1, the electrode assembly comprises two porous carbon composite plates 1 and 2, bound together by an interfacial polymer binder layer 3. In FIG. 1b, the geometric area of the polymer film is bigger than that of the carbon composite plates. The edge area of the polymer film 4 and 5, which is not in contact with the carbon plate, is not subjected to the thermal treatment and compression. Therefore, it remains intact.

Referring again to FIG. 1, the electrode assembly may comprise one porous carbon composite 1, and one battery electrode 2.

Figure 2:
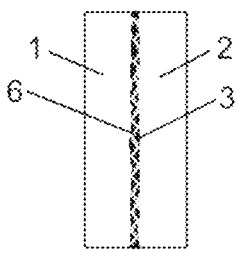
FIG. 2 is side view of a bipolar carbon electrode configuration with a current collector within the interfacial polymer layer
Figure 2:
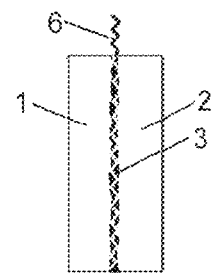

Referring to FIG. 2, an electrode assembly comprises two porous carbon composite electrode plates 1 and 2, a current collector 6, sandwiched between the two carbon plates, and two interfacial polymer binder layers 3, between each carbon plate and current collector, respectively.

Referring again to FIG. 2, each of the carbon electrodes is in direct physical contact with the current collector through an interfacial polymer binder layer having polymer impregnating into the pores near surface of the carbon plates and into pores or open spaces in the current collector. The interfacial polymer binder layer is electronically conducting or both electronically conducting and ionically insulating.

As an option, one of the carbon electrodes in FIG. 2 is replaced by a battery electrode 2.

Figure 3:
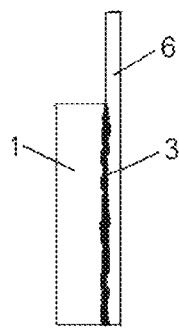
FIG. 3 is side view of an electrode assembly configuration comprising one carbon composite electrode and one current collector

Referring to FIG. 3, an electrode assembly comprises one porous carbon electrode 1, a current collector 6, and an interfacial polymer binder layer 3, between the carbon electrode and the current collector.

Figure 4:
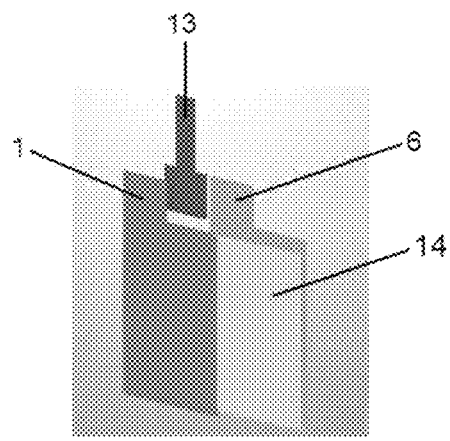
FIG. 4 is configuration of an electrode assembly for use as anode in lead acid battery/capacitor hybrid comprising a porous carbon composite electrode, a graphite current collector, and a lead terminal.

Referring to FIG. 4, an electrode assembly comprises a porous carbon composite electrode 1, a graphite film as current collector 6, and a lead terminal 13, sandwiched between the carbon electrode and graphite film in the upper section and an interfacial polymer binder layer 14 between the graphite film and the carbon plate in the low section. The upper section refers to the overlapping section area among the lead terminal, the graphite film, and the carbon electrode. The low section refers to the section area that overlaps only the graphite film and the carbon electrode. The carbon electrode, graphite film, and lead terminal in the upper section are soldered together by additional lead. The carbon electrode and graphite film in the low section is bound by the interfacial polymer binder layer. This electrode assembly is for use as anode for lead acid battery/capacitor hybrid.

Referring again to FIG. 4, an electrode assembly may comprise two porous carbon composite electrodes sandwiching a graphite film as current collector, a metal terminal in upper section, and interfacial polymer binder layers between each of the carbon electrodes and graphite film, respectively in the lower section. The upper section refers to the overlapping area among the carbon electrodes, graphite films, and the metal terminal, bound together. The binding in the upper section can be done by lead soldering or by interfacial polymer binder layers or by a combination of both. The lower section refers to the overlapping area among the carbon electrodes and graphite, bound to each other by interfacial polymer binder layers.

Figure 5:
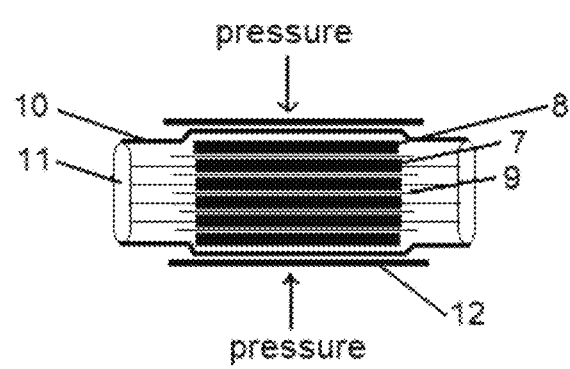
FIG. 5 is a schematic view of an electrochemical capacitor employing 4 bipolar porous carbon composite electrodes and 2 single carbon composite electrodes to make five cells connected in series.

Referring to FIG. 5, a prototype electrochemical capacitor comprising five cells connected in series is assembled from four bipolar porous carbon composite electrode assemblies 7, two porous carbon composite electrodes as end electrode plates 8, electrode separator 9, conductive carbon films as current collectors and package seal 10, non-conductive binding to seal each cell to be insulated from each other and external environment 11, and metallic foil or plate as external current collectors or terminals 12. The electrolyte is filled into the porous carbon electrodes and separators. During the capacitor assembly, a slight compression pressure is applied.

The electrode assemblies are prepared by placing polymer film between the pair of porous carbon composite electrodes or between each porous carbon composite electrode and the current collector or between one porous carbon composite electrode and a battery electrode. Then, the electrode assembly is pressed under compression pressure at or above melting temperature or above the softening temperature of the polymer for the polymer melt to impregnate the pores in the carbon composite electrode and pores or open spaces within the current collector. Although the polymer film is not electrically conductive before assembly, the interfacial polymer binder layer becomes electronically conductive as thermal pressing enables physical contact of conductive carbon of the porous carbon composite electrode to the other electrode or current collector at the interface. Depending on process conditions, the interfacial polymer binder layer could also be ionically insulating.

The compression pressure is in the range of 300 psi to 2000 psi. More compression pressure can be applied as allowed by the compression strength of the carbon electrodes.

The polymers in the polymer binder layer are preferably thermoplastic polymers including polyethylene, polypropylene, polytetrafluoride (PTFE), polyvinyl fluoride (PVDF), polyvinylchloride, polystyrene, fluorine containing polymers, such as ETFE, copolymers thereof, and combinations thereof.

The polymer film for making the interfacial polymer binder layer can be either self standing polymer film or polymer film supported on the current collector or polymer film supported on the porous carbon composite electrode or on the electrode. In the later cases, the polymer film may be casted onto the current collector or onto the electrode from a polymer solution or a polymer suspension.

As an option, the polymer film may contain additives within for the purpose of increasing electrical conductivity. For example, additives could be graphite or carbon powder.

The current collectors are selected from graphite films, metallic foils, metallic foils with spikes on one or both surface planes, mesh, and screens. The metals in metallic current collectors are selected from copper, aluminum, iron, titanium, silver, gold, platinum, palladium, tin, zinc, cobalt, nickel, lead, and combinations and alloys thereof.

When the metallic current collectors are in the forms of mesh, screens, or metallic foils with spikes, the interfacial polymer binder layer between the carbon composite and current collector may become discontinuous as the sharp points or edges on the current collector might penetrate through the interfacial binder layer. In such cases, the interfacial binder layer may not be ionically insulating.

EXAMPLES

Example 1

Two porous activated carbon/carbon composite plates of 0.090 gram weight and 2.4 cm×2.4 cm×0.03 cm dimension per each plate were sandwiched by a 4 cm×4 cm×0.015 mm polyethylene film. The assembly was pressed at 130° C.-150° C. under 700 psi pressure until the polymer melt impregnated into pores of the carbon electrodes. The edges of the polymer film outside of the carbon plates did not melt. Thus, edges of the polymer film outside of the carbon plates were both ionically and electrically insulating. The electrode assembly was used as bipolar electrode for an electrochemical capacitor.

Four bipolar carbon electrodes and two more single porous carbon composite plates as end electrode plates were used to assemble an electrochemical capacitor with five cells connected in series. The average weight of the porous carbon composite plate was 0.085-0.088 gram per plate. 37% by weight aqueous sulfuric acid was used as electrolyte and 3501 Celgard polymer films (commercial porous polypropylene film) were used as electrode separators. The edges of the polymer film on the bipolar carbon electrodes were used for sealing to insulate cells from each other. Conductive carbon films were used as end current collectors and package seal. Metallic foils were placed outside of the conductive carbon films as external current collectors.

FIG. 5 illustrates the electrochemical capacitor with five cells connected in series. Each cell is ionically insulated from each other.

The prototype electrochemical capacitor was tested at 100 mA constant current charging/discharging cycles. The maximum charging voltage was 4.2 V. The capacitance was 1.15 F and the ESR (equivalent series resistance) was 0.44 Ohm.

Example 2

A bipolar porous carbon composite electrode assembly was prepared according to the procedure and material dimensions in Example 1.

One bipolar electrode and two porous activated carbon/carbon composite plates as end electrode plates were used for making an electrochemical capacitor with two cells connected in series. The average weight of the carbon electrode was 0.095-0.097 gram per each plate. 37% by weight aqueous sulfuric acid was used as electrolyte to fill porous carbon electrodes and porous separators. 3501 Celgard polymer films were used as electrode separators. Conductive carbon films were used as current collectors and package seal. Two metal foils were placed outside of the conducting carbon films to function as external electrical current collectors or terminals.

The prototype electrochemical capacitor was tested at 100 mA constant current charging/discharging cycles. The maximum charging voltage was 1.8 V. The discharging capacitance was 3.4 F. The ESR was 0.22 Ohm.

Example 3

Two carbon electrode assemblies using activated carbon/carbon composite as active carbon electrode plates were prepared in reference to FIG. 4. The carbon electrodes were each 7.8 gram and 0.25 cm thickness. The dimension of each carbon electrode was 2.5"×3" for the low section and 1"×1" for the upper section. The graphite foils were 0.2 mm thick and had the same in-plane dimensions as the carbon electrodes. The electrode assembly was prepared by sandwiching a polyethylene film between the carbon plate and graphite foil in the lower section. The assembly was pressed under compression pressure at 130° C.-150° C. until the polyethylene melt impregnated into pores of graphite foil and carbon electrodes. A lead terminal was sandwiched between graphite foil and the carbon plate in the upper section before being soldered to the graphite foil and carbon by additional lead.

A single cell of lead acid battery/capacitor hybrid was assembled by using a lead oxide cathode retrieved from a commercial lead acid battery and two porous carbon electrode assemblies prepared above as anodes. The two carbon anodes were placed on either side of the lead oxide cathode. A 1.0 mm thick battery separator was placed between each porous carbon electrode assembly and cathode, respectively. Aqueous acid electrolyte for commercial lead acid battery was used as electrolyte to fill the cell. The cell, housed in a polypropylene container, was sealed with a release valve.

At 200 mA constant current charging/discharging the cell resistance, R(dc), calculated from the initial discharging was 0.058 Ohm. When charged to 2.0V, the discharging capacity was 1.10 Ah and charge efficiency was 94%. The energy efficiency was 77%.

Example 4

An electrode assembly in reference to FIG. 2 (b), comprising two activated carbon/carbon composite plates, a copper mesh coated with tin/lead alloy coating as current collector, and interfacial polyethylene binder layer between each carbon electrode plate and current collector, respectively, was prepared.

The components for the electrode assembly were stacked in the following order: carbon electrode/polyethylene film/coated copper mesh/polyethylene film/carbon electrode. The assembly was pressed under 1000 psi compression pressure at 130° C.-150° C. until the polyethylene melt was impregnated into the pores of carbon electrodes and open space in the current collector.

What is claimed is:

1. A porous carbon electrode assembly for electrochemical devices comprising: at least one binderless porous carbon composite electrode; an electrically conducting solid object in direct physical contact with the binderless porous carbon composite electrode; and at least one interfacial polymer binder layer binding the binderless porous carbon composite electrode to the solid object; wherein the interfacial polymer binder layer contains polymer both impregnating into the pores of the binderless porous carbon composite electrode and embedding the areas of physical contact between the binderless porous carbon composite electrode and the solid object; and wherein the interfacial polymer binder layer is ionically insulating.

2. The porous carbon electrode assembly of claim 1, wherein the electrically conducting solid object is selected from second electrode a current collector, and a combination thereof.

3. The porous carbon electrode assembly of claim 1, wherein the interfacial polymer binder layer is electronically conducting.

4. The porous carbon electrode assembly of claim 2, wherein the second electrode includes a binderless porous carbon composite electrode.

5. The porous carbon electrode assembly of claim 2, wherein the current collector is selected from a graphite film, metallic plates, or a combination thereof.

6. The porous carbon electrode assembly of claim 5, wherein the metallic plates is in a form including foil, mesh, screen, or a combination thereof.

7. The porous carbon electrode assembly of claim 1 comprising: two electrodes at least one of the two electrodes being a binderless porous carbon composite electrode, and an interfacial polymer binder layer between the electrodes, wherein the electrode assembly is prepared by a process including:
providing two electrodes, at least one of the two electrodes being the binderless porous carbon composite electrode;
placing a polymer film between the two electrodes to form an assembly; and
thermal pressing the assembly under compression at or above the melting temperature or above the softening temperature of the polymer until the polymer melt impregnates pores of the binderless porous carbon composite electrode or electrodes.

8. The porous carbon electrode assembly of claim 7, wherein the two electrodes after thermal pressing are in direct physical contact within the polymer.

9. The porous carbon electrode assembly of claim 1, wherein the electrode assembly comprising two binderless porous carbon composite electrodes and an interfacial polymer binder layer between the electrodes is for a use including bipolar electrode assembly in an electrochemical capacitor.

10. The porous carbon electrode assembly of claim 1 comprising: at least one binderless porous carbon composite electrode, one current collector, and an interfacial polymer binder layer between the electrode and the current collector, wherein the electrode assembly is prepared by a process including:
providing at least one binderless porous carbon composite electrode and one current collector;
placing a polymer film between each binderless porous carbon composite electrode and the current collector to form an assembly; and
thermal pressing the assembly under compression at or above the melting temperature or above the softening temperature of the polymer until the polymer melt impregnates pores of the binderless porous composite carbon electrode or electrodes.

11. The porous carbon electrode assembly of claim 10, wherein the binderless porous carbon composite electrode and the current collector after thermal pressing are in direct physical contact within the polymer.

12. The porous carbon electrode assembly of claim 1, wherein the electrode assembly comprising two binderless porous carbon composite electrodes placed on either side of a current collector is for a use including bipolar electrode assembly.

* * * * *